(12) United States Patent
Kim et al.

(10) Patent No.: US 8,300,027 B2
(45) Date of Patent: Oct. 30, 2012

(54) VIBRATION TOUCH SENSOR, METHOD FOR VIBRATION TOUCH SENSING AND VIBRATION TOUCH SCREEN DISPLAY PANEL

(75) Inventors: Eok Su Kim, Seongnam-si (KR); Jaeyoung Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 422 days.

(21) Appl. No.: 12/628,625

(22) Filed: Dec. 1, 2009

(65) Prior Publication Data

US 2010/0156845 A1 Jun. 24, 2010

(30) Foreign Application Priority Data

Dec. 24, 2008 (KR) ........................ 10-2008-0133345

(51) Int. Cl.
*G06F 3/045* (2006.01)
(52) U.S. Cl. ........................................ 345/174
(58) Field of Classification Search .................. 345/174, 345/173; 73/597
See application file for complete search history.

(56) References Cited

U.S. PATENT DOCUMENTS

| 7,082,832 B2 * | 8/2006 | Yabuta et al. ................... 73/597 |
| 7,515,138 B2 * | 4/2009 | Sullivan ........................ 345/173 |
| 2006/0279548 A1 * | 12/2006 | Geaghan ....................... 345/173 |
| 2008/0150911 A1 | 6/2008 | Harrison |

FOREIGN PATENT DOCUMENTS

| JP | 05020226 | 1/1993 |
| JP | 2003186622 | 7/2003 |
| JP | 2003288158 | 10/2003 |
| JP | 2005078644 | 3/2005 |
| JP | 2005352927 | 12/2005 |
| KR | 1020060113595 | 11/2006 |

* cited by examiner

*Primary Examiner* — Fred Tzeng
(74) *Attorney, Agent, or Firm* — Cantor Colburn LLP

(57) ABSTRACT

A vibration touch sensor includes; a first substrate, a second substrate arranged to face the first substrate with a predetermined gap therebetween, a first electrode disposed on the first substrate, a second electrode disposed on the second substrate, a piezoelectric material layer disposed on one of the first electrode and the second electrode, wherein the piezoelectric material layer generates an electrical signal in response to an external touch applied to at least one of the first substrate and the second substrate, and a controller which receives the electrical signal generated from the piezoelectric material layer and generates a touch input signal, the controller controlling an alternating current voltage applied to at least one of the first electrode and the second electrode.

18 Claims, 8 Drawing Sheets

VIBRATION TOUCH SENSOR, METHOD FOR VIBRATION TOUCH SENSING AND VIBRATION TOUCH SCREEN DISPLAY PANEL

CROSS-REFERENCE TO RELATED APPLICATION

This application claims priority to Korean Patent Application No. 10-2008-0133345, filed on Dec. 24, 2008, and all the benefits accruing therefrom under 35 U.S.C. §119, the contents of which in its entirety are herein incorporated by reference.

BACKGROUND

1. Field

This disclosure relates to a vibration touch sensor, a method for vibration touch sensing, and a vibration touch screen display panel.

2. Description of the Related Art

A touch screen panel is one of a plurality of different input devices used for input of specific instructions or data to electronic devices, and the typical touch screen panel may be installed on a front surface of a display of electronic devices such as personal computers, notebooks and portable media players ("PMPs") such that a user may touch the panel using a finger, a stylus or a pen to input texts or pictures.

Generally, touch screen panels are mainly operated according to a resistive overlay method or a capacitive overlay method. A touch screen panel adopting the capacitive overlay method is configured such that upper and lower electrodes patterned in orthogonal directions are separated by means of dielectric material, and such a touch screen panel recognizes the change of capacitance at crossing points between the lower and upper electrodes due to a touch which decreases a distance between the lower and upper electrodes. The touch screen panel adopting the resistive overlay method is configured such that lower and upper electrodes patterned in orthogonal directions are separated by means of a spacer, and it recognizes the change of resistance caused by a contact between the lower and upper electrodes due to a touching force which deforms the electrodes so that they make electrical contact.

SUMMARY

The disclosure describes exemplary embodiments of a vibration touch sensor, a method for vibration touch sensing, and a vibration touch screen display panel, employing a piezoelectric material layer such that, when a touch is made thereto, the vibration touch sensor may recognize a touch input and give a local vibration to the touched region for a user to feel the sense of touch.

In one exemplary embodiment, there is provided a vibration touch sensor which includes; a first substrate, a second substrate arranged to face the first substrate with a predetermined gap therebetween, a first electrode disposed on the first substrate, a second electrode disposed on the second substrate, a piezoelectric material layer disposed on one of the first electrode and the second electrode, wherein the piezoelectric material layer generates an electrical signal in response to an external touch applied to at least one of the first substrate and the second substrate, and a controller which receives the electrical signal generated from the piezoelectric material layer and generates a touch input signal, the controller controlling an alternating current ("AC") voltage applied to at least one of the first electrode and the second electrode.

In one exemplary embodiment, after receiving the generated electrical signal, the controller applies a first AC voltage to at least one of the first electrode and the second electrode.

In one exemplary embodiment, a first AC voltage may be applied to one of the first electrode and the second electrode, and a second voltage having a different magnitude from the first alternating current voltage may be applied to the other one of the first electrode and the second electrode.

In one exemplary embodiment, the second voltage may be a ground voltage. In one exemplary embodiment, the first AC voltage may be substantially equal to a voltage of a common electrode of a liquid crystal display, and wherein the second voltage may be substantially equal to a voltage of a gate electrode of the liquid crystal display.

In one exemplary embodiment, when an external touch is applied to at least one of the first substrate and the second substrate, both the first electrode and the second electrode may contact the piezoelectric material layer such that the first alternating current voltage and the second voltage are applied to both ends of the piezoelectric material layer.

In another exemplary embodiment, a method for vibration touch sensing includes; receiving an electrical signal generated from a piezoelectric material layer formed on one of a first electrode and a second electrode to generate a touch input signal when an external touch is applied, applying a first AC voltage to at least one of the first electrode and the second electrode when receiving the touch input signal, contacting the first electrode and the second electrode to both ends of the piezoelectric material layer using the external touch and generating a vibration in a touched region using the first AC voltage.

In one exemplary embodiment, the step of generating a touch input signal according to an electrical signal may include recognizing the existence of the external touch and the location of a touched region according to the electrical signal and generating a touch input signal.

In one exemplary embodiment, the method may further include; applying a second voltage having different magnitude from the first AC voltage to the one of the first electrode and the second electrode which did not receive the first alternating current voltage.

In one exemplary embodiment, the second voltage may be a ground voltage.

In one exemplary embodiment, the first voltage may be substantially equal to a voltage of a common electrode of a liquid crystal display, and the second voltage may be substantially equal to a voltage of a gate electrode of the liquid crystal display.

In another exemplary embodiment, a method for vibration touch sensing includes; applying a first AC voltage to one of the first electrode and the second electrode, receiving an electrical signal generated from a piezoelectric material layer formed on at least one of the first electrode and the second electrode to generate a touch input signal, when an external touch is applied, contacting the first electrode and the second electrode to both ends of the piezoelectric material layer by application of the external touch, and generating a vibration in a touch region using the first AC voltage.

In one exemplary embodiment, the action of generating a touch input signal according to an electrical signal may include recognizing the existence of the external touch and a location of the touched region according to the electrical signal and generating a touch input signal.

In one exemplary embodiment, the method may further include applying a second voltage having different magnitude from the first AC voltage to the one of the first electrode and the second electrode not applied with the first alternating current voltage.

In one exemplary embodiment, the second voltage may be a ground voltage.

In one exemplary embodiment, the first voltage may be substantially equal to a voltage of a common electrode of a liquid crystal display, and the second voltage may be substantially equal to a voltage of a gate electrode of the liquid crystal display.

In another exemplary embodiment, a vibration touch screen display panel includes; a display panel, and a vibration touch sensor disposed on a front surface of the display panel, the vibration touch sensor including; a first substrate, a second substrate arranged to face the first substrate with a predetermined gap disposed therebetween, a first electrode disposed on the first substrate, a second electrode disposed on the second substrate, a piezoelectric material layer disposed on one of the first electrode and the second electrode, wherein the piezoelectric material layer generates an electrical signal in response to an external touch applied to at least one of the first substrate and the second substrate, and a controller which receives an electrical signal generated from the piezoelectric material layer, the controller controlling an AC voltage to be applied to one of the first electrode and the second electrode.

In one exemplary embodiment, the display panel may be a liquid crystal display panel; the first electrode may be electrically connected to a common electrode of the liquid crystal display panel, and the second electrode may be electrically connected to a gate electrode of the liquid crystal display panel.

The disclosed vibration touch sensor senses an external touch signal without any separate mechanical device and generates a local vibration on the touched region, so a user may feel the sense of touch by vibration on the touched region.

The disclosed vibration touch screen display panel may recognize a plurality of electric signals generated by an external touch, so a user may recognize multi touches.

The disclosed vibration touch screen display panel may operate the vibration touch sensor by sharing an electrode of a liquid crystal display.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
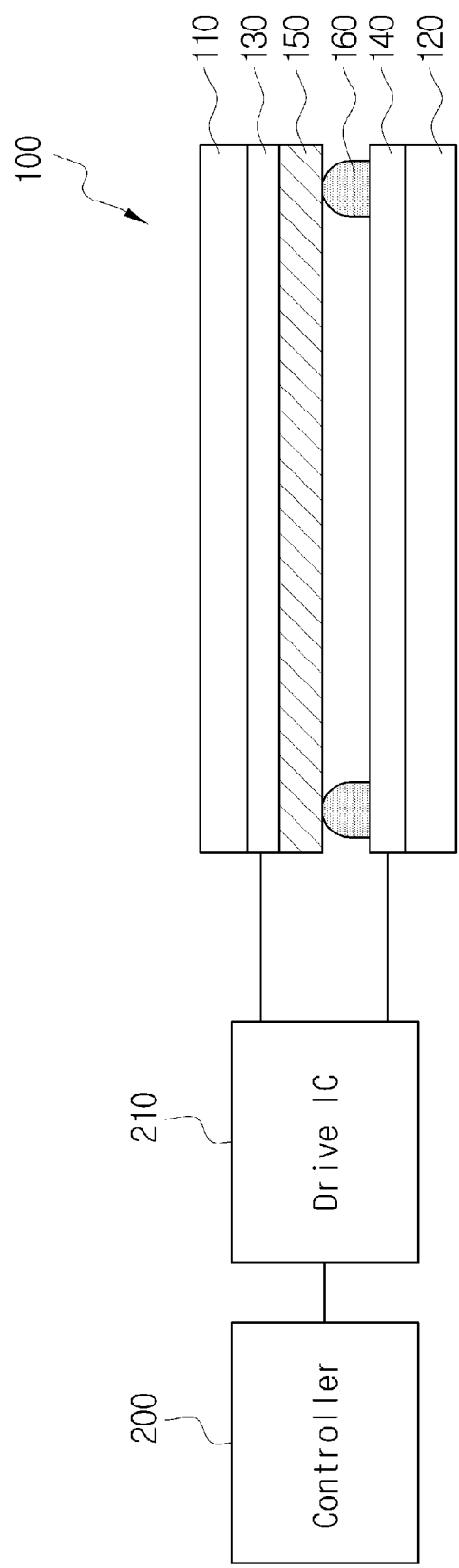
FIG. 1 is a cross-sectional view of an exemplary embodiment of a vibration touch sensor.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded.

Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

FIG. 1 is a cross-sectional view of one exemplary embodiment of the structure of a vibration touch sensor.

Referring to FIG. 1, the present exemplary embodiment of a vibration touch sensor 100 includes a first substrate 110 and a second substrate 120 arranged to face each other with a predetermined interval disposed therebetween, a first electrode 130 and a second electrode 140 respectively formed on the first and second substrates 110 and 120, a piezoelectric material layer 150 formed on one of the first and second electrodes 130 and 140, wherein the piezoelectric material layer 150 generates an electric signal when an external touch is applied to one of the first and second substrates 110 and 120, and a controller 200 for receiving an electric signal generated from the piezoelectric material layer to generate a touch input signal and also for controlling an alternating current ("AC") voltage applied to the first or second electrodes 130 and 140.

Exemplary embodiments of the first and second substrates 110, 120, may include transparent glass, polymer or other similar materials. In one exemplary embodiment, the first substrate 110 may be attached to a display panel. Alternative exemplary embodiments include configurations wherein the second substrate 120 may be attached to a display panel. In the exemplary embodiment wherein the second substrate 120 is attached to a display panel, the first substrate 110 is used as a substrate to which an external touch is made, e.g. by a hand, touch pen, stylus, etc. The first and second substrates are arranged to face each other while maintaining a predetermined gap therebetween. In one exemplary embodiment a support spacer 160 may be used for maintaining the predetermined gap.

The first electrode 130 is formed on the first substrate. In one exemplary embodiment, a voltage may be substantially constantly applied to the first electrode 130. Alternative exemplary embodiments include configurations wherein voltage may be applied to the first electrode 130 if an external touch is made and after the external touch is recognized.

The second electrode 140 is formed on the second substrate. Similar to the first electrode 130, in one exemplary embodiment, a voltage may be substantially constantly applied to the second electrode 140. Alternative exemplary embodiments include configurations wherein voltage may be applied to the second electrode 140 if an external touch is made and after the external touch is recognized.

The piezoelectric material layer 150 generates an electric signal when a volume is changed due to an externally applied pressure, and vice versa, if an electric signal is input, the volume may be changed. The piezoelectric material layer 150 may be formed on any one of the first and second electrodes 130 and 140.

The controller 200 controls touch sensing if an external touch is made, and the controller controls a voltage to be applied to the first or second electrode of a voltage driver 210. A plurality of voltage drivers would be used, if they are needed.

The present exemplary embodiment of a touch sensor may include a voltage driver 210. The voltage driver applies a voltage to any one of the first and second electrodes 130 and 140 as instructed by the controller. The voltage driver applies a first AC voltage to any one of the first and second electrodes 130 and 140. Specifically, the voltage driver may apply the first AC voltage to the first electrode 130 or apply the first AC voltage to the second electrode 140. The voltage driver applies the first AC voltage to one electrode and also applies a second voltage having different magnitude from the first voltage to the other electrode.

In the present exemplary embodiment, the second voltage may be an AC voltage having a different magnitude from the first voltage or a constant DC voltage. In one exemplary embodiment, one electrode may be connected to a ground potential such that a ground voltage is applied thereto.

In one exemplary embodiment, the vibration touch sensor 100 may include a separate voltage driver, although alternative exemplary embodiments include configurations wherein a voltage driver of a display device to which the vibration touch sensor is attached may be utilized as a voltage driver of the vibration touch sensor 100.

Figure 2:
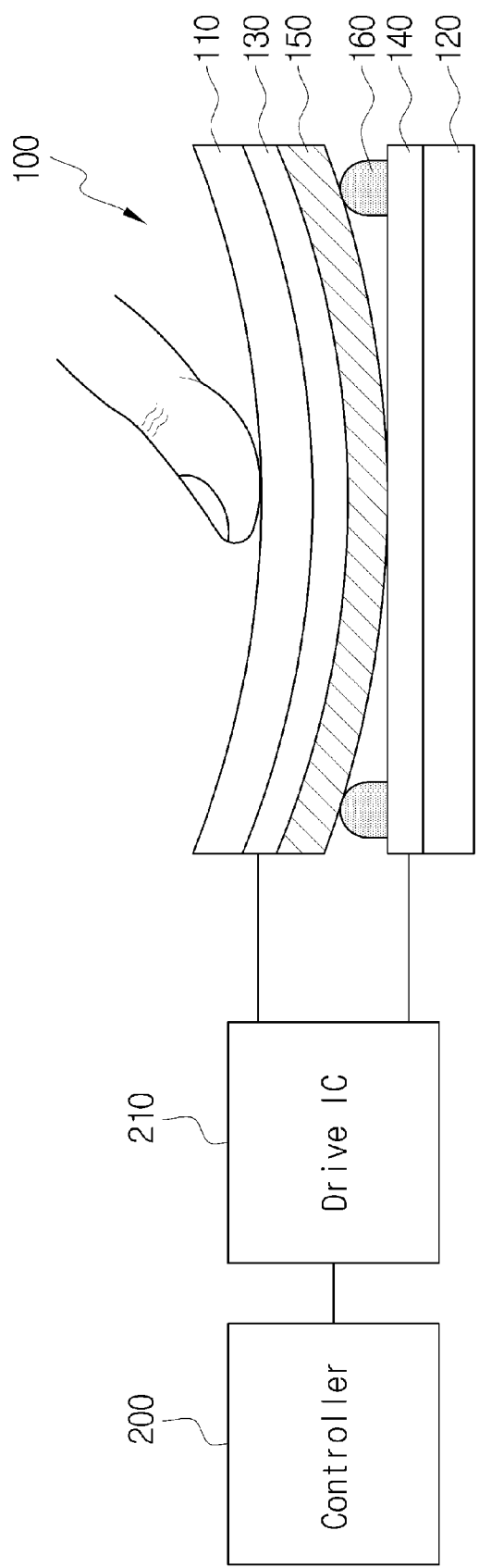
FIG. 2 is a cross-sectional view showing the exemplary embodiment of a vibration touch sensor during the application of an external touch.

FIG. 2 is a cross-sectional view showing the exemplary embodiment of a vibration touch sensor during the application of an external touch thereto.

Referring to FIG. 2, operations of the present exemplary embodiment of a vibration touch sensor will be explained in more detail. In this exemplary embodiment the first substrate 110 is used for touching by a user, the second substrate 120 is attached to a display panel, and the piezoelectric material layer 150 is formed on the first substrate 110.

If a touch is made to the first substrate 110 by a hand, touch pen or other similar object, the piezoelectric material layer 150 is compressed due to the pressure of the external touch, so the volume of the piezoelectric material layer 150 is changed. As the volume is changed, the piezoelectric material layer 150 generates an electrical signal.

When sensing the electrical signal, the controller recognizes that there is an external touch input, and then the controller may determine the location of the electric signal and generate a touch input signal corresponding to the external touch input. Specifically, the controller generates an input signal for the touched region such that the display device may be controlled according to the touch input signal. In this way, the touch sensing is performed.

According to the present exemplary embodiment, along with the touch sensing process, a vibration is generated in the touched region as follows. If a touch is made to the first substrate 110 by a hand, touch pen or other similar object, the piezoelectric material layer 150 formed on the first electrode 130 is contacted with the second electrode 140 formed on the second substrate 120 by means of the pressure caused by the external touch. Since the first and second electrodes 130 and 140 are contacted with the piezoelectric material layer 150, the piezoelectric material layer 150 formed on the first electrode 130 receives the first voltage from the first electrode 130 and also receives the second voltage from the second electrode 140 by means of the contact.

In such a situation, the controller may control the voltage driver to control a voltage value to be applied to the first and second electrodes 130 and 140. The piezoelectric material layer 150 is formed on the first electrode 130, so that it may receive the first voltage substantially continuously, or at least whenever the first voltage is applied to the first electrode 130 via the voltage driver. However, since voltage is not applied to both ends of the piezoelectric material layer, e.g., the surfaces thereof, voltage does not flow in the piezoelectric material layer if there is no external touch. When the second voltage is applied to the piezoelectric material layer 150 due to the contact, voltage flows between both ends of the piezoelectric material layer 150.

The voltage driver may apply the first AC voltage to the first electrode 130 and apply the second voltage to the second electrode 140. Exemplary embodiments include configurations wherein the second electrode may be connected to the ground potential. Exemplary embodiments include configurations wherein the second voltage may have any magnitude different from the first AC voltage.

As discussed above, exemplary embodiments include configurations wherein voltage may be substantially continuously applied to the first electrode 130. However, alternative exemplary embodiments also include configurations wherein the voltage driver is controlled such that an AC voltage is applied to the first electrode 130 only when an electrical signal is sensed due to touch sensing. Also, exemplary embodiments include configurations where voltage may be substantially continuously applied to the second electrode 140. However, alternative exemplary embodiments also include configurations wherein the voltage driver is controlled such that a constant voltage is applied to the second electrode 140 when an electrical signal is sensed due to touch sensing. In addition, exemplary embodiments include configurations wherein the second electrode 140 may be always connected to the ground to maintain a ground voltage.

If different voltages are applied to both ends of the piezoelectric material layer 150, voltage flows along the piezoelectric material layer 150, and due to the alternation of the AC voltage, the volume of the piezoelectric material layer is alternatingly changed, e.g., the volume of the piezoelectric material layer is alternately increased and decreased. Thus, vibration is generated in the touched region due to the volume changes of the piezoelectric material layer.

Figure 3:
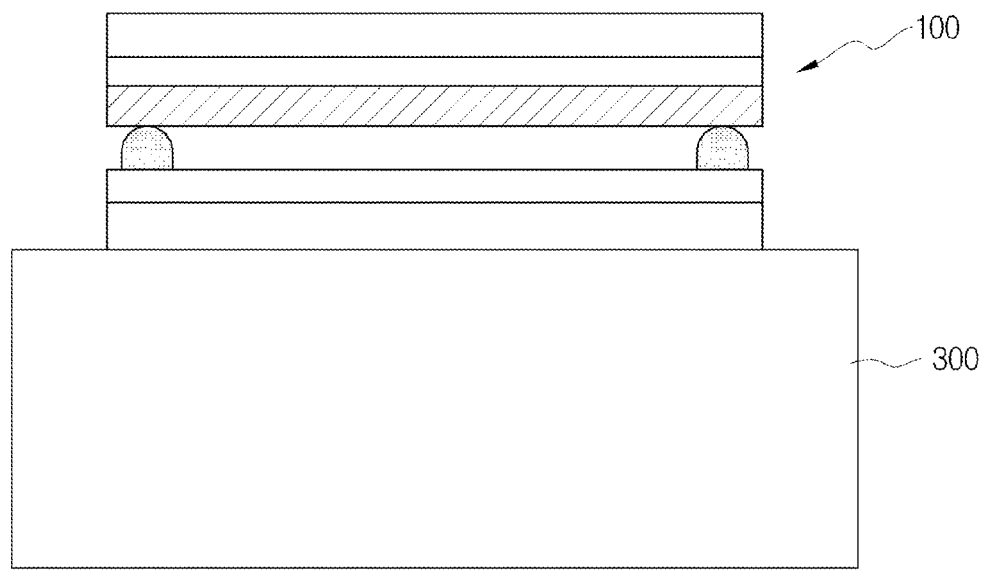
FIG. 3 is a schematic view of the exemplary embodiment of a vibration touch sensor attached to an exemplary embodiment of a display.
Figure 4:
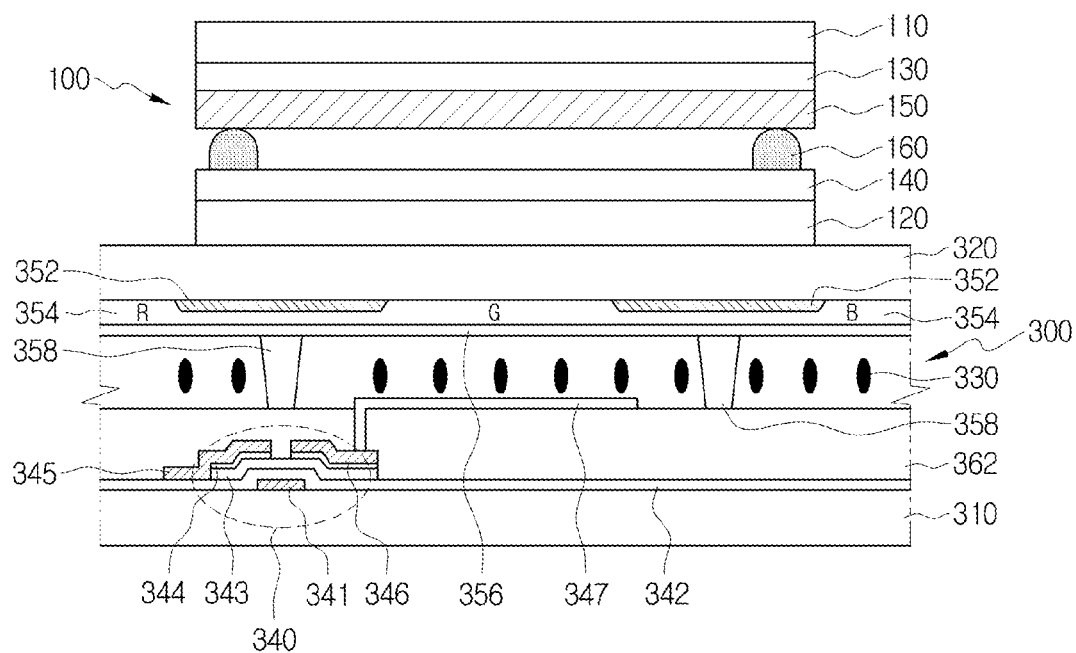
FIG. 4 is a cross-sectional view showing a detailed structure of an exemplary embodiment of a liquid crystal display panel used as the display panel of FIG. 3.

FIG. 3 is a schematic view of the exemplary embodiment of a vibration touch sensor attached to an exemplary embodiment of a display device, and FIG. 4 is a cross-sectional view showing a detailed structure of an exemplary embodiment of a liquid crystal display ("LCD") panel used as the display panel of FIG. 3.

Referring to FIG. 3, the current exemplary embodiment of a vibration touch sensor 100 may be attached to a front surface of a display panel 300.

Referring to FIG. 4, the configuration of the exemplary embodiment of a vibration touch sensor attached to the exemplary embodiment of an LCD panel is explained in detail. The vibration touch screen display panel of this exemplary embodiment includes a display panel and a touch sensor attached to a front surface of the display panel.

While the present exemplary embodiment is described with respect to an LCD panel 300, alternative exemplary embodiments of the display panel may be any display device, not limited to its kind. Exemplary embodiments of the display panel include the LCD panel, a plasma display panel ("PDP"), an organic light-emitting diode ("OLED") display panel, and various other similar apparatus. Hereinafter, for convenience and brevity of explanation, an exemplary embodiment wherein the display panel is based on a liquid crystal display panel is described in more detail.

Similar to the first and second substrates 110 and 120 of the vibration touch sensor 100, exemplary embodiments of a first substrate 310 and a second substrate 320 of the display panel 300 may be transparent glass substrates, polymer substrates or substrates made from other similar materials.

On the first substrate 310, also called a lower substrate, a plurality of thin-film transistors ("TFTs") 340 are arranged in matrix form as switching elements. Each of the plurality of TFTs 340 includes a gate electrode 341 formed on the lower substrate 310, an insulation film 342 formed on the gate electrode 341, and a source electrode 345 and a drain electrode 346 formed on the insulation film 342. An activation layer 343 for forming a channel between the source electrode 345 and the drain electrode 346 and an ohmic contact layer 344 for reducing contact resistance between the activation layer 343 and the source electrode 345 and the drain electrode 346 may be disposed among the insulation film 342, the source electrode 345 and the drain electrode 346. The plurality of TFTs 340 are covered by a protection layer 362. Exemplary embodiments of the protection layer 362 may be made of dielectric material to form a capacitor of the touch sensor 100, as explained in more detail below. Alternative exemplary embodiments include configurations wherein the TFT includes additional elements or wherein elements of the TFT are omitted. Alternative exemplary embodiments also include configurations wherein the order in which the components of the TFT are arranged may be altered.

A plurality of gate lines and a plurality of data lines are arranged on the lower substrate 310 to be substantially perpendicular to each other. The plurality of gate lines may be extended in a first direction, for example an X-axis direction, and the plurality of data lines may be extended in a second direction orthogonal to the first direction, for example a Y-axis direction. The plurality of gate lines are formed on the lower substrate 310 and connected to the gate electrode 341, and they are covered by the insulation film 342. The plurality of data lines are formed on the insulation film 342 and connected to the source electrode 345, and they are covered by the protection layer 362. Namely, the plurality of gate lines and the plurality of data lines are formed to be substantially perpendicular to each other with the insulation film 342 being interposed between them, and the plurality of TFTs 340 are respectively formed at areas where the plurality of gate lines and the plurality of data lines overlap one another. Also, a plurality of pixel electrodes 347 corresponding to each pixel are respectively formed on the protection layer 362, and the plurality of pixel electrodes 347 are respectively connected to the plurality of drain electrodes 346 through contact holes. In one exemplary embodiment, the plurality of pixel electrodes 347 may be made of a transparent conductive material, exemplary embodiments of which may include indium tin oxide ("ITO") and indium zinc oxide ("IZO").

On the second substrate 320, also referred to as an upper substrate, a black matrix 352, a color filter 354 and a common electrode 356 are formed. The black matrix 352 is made of opaque material to prevent leakage of light, and it is arranged between pixels and extended in the second direction, namely in the Y-axis direction. The color filter 354 corresponds to, e.g., is aligned with, each pixel and has red (R), green (G) and blue (B) colors. The common electrode 356 is made of transparent conductive material and formed on a surface of the color filter 354. Exemplary embodiments include configurations wherein the common electrode 356 is made from a similar transparent conductive material to the material used in the pixel electrode 347. Alternative exemplary embodiments also include configurations wherein the color filter 354 and/or the common electrode 356 may be formed on the first substrate 310.

A support spacer 358 is disposed between the lower substrate 310 and the upper substrate 320 to maintain a predetermined cell gap therebetween. In one exemplary embodiment, the support spacer 358 may be formed on the upper substrate 320 that has a relatively simple and flat structure rather than the lower substrate 310. In such an exemplary embodiment, the support spacer 358 may be formed on the surface of the color filter 354, and then the common electrode 356 may be formed on the surfaces of the color filter 354 and the surface of the support spacer 358.

If a scanning signal is applied to the gate line and a picture signal is applied the data line, a pixel corresponding to the crossing area thereof is selected. At this time, the thin-film transistor 340 of the selected pixel is turned on to form an electric field between the pixel electrode 347 and the common electrode 356, and accordingly molecular arrangement of a liquid crystal 330 in the corresponding area is varied to change transmittance of light passing therethrough. The light passing through the liquid crystal 330 is filtered by the R, G and B color filters 354 and then emitted to the front of the display panel.

The vibration touch sensor 100 of the above described exemplary embodiment may be attached to a front surface of such an LCD panel.

In such an exemplary embodiment, the first electrode 130 and the second electrode 140 of the vibration touch sensor may be connected to an electrode of the LCD panel. In the exemplary embodiment wherein an AC voltage is applied to the first electrode 130, the first electrode 130 is connected to the common electrode 356 of the LCD panel, and the second electrode 140 may be connected to the gate electrode 341 or to the ground.

Figure 5:
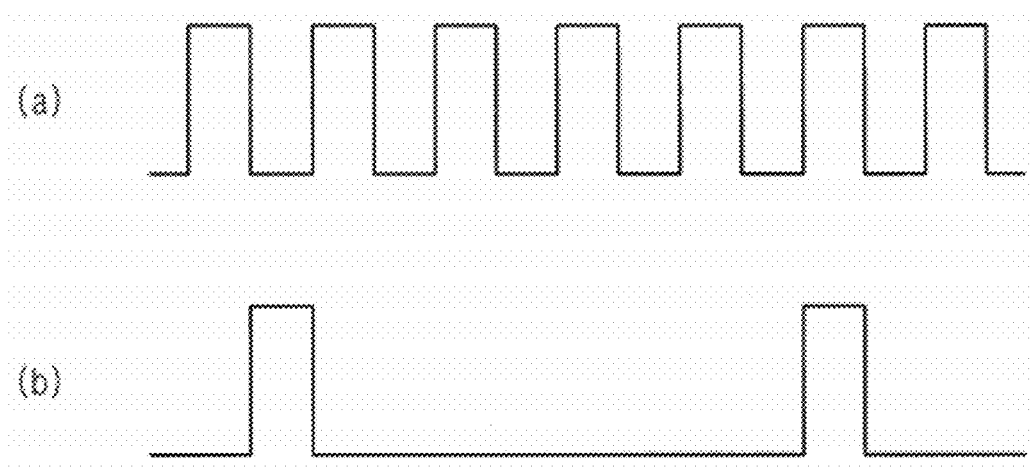
FIG. 5 shows one exemplary embodiment of waveforms of voltages applied to first and second electrodes.
Figure 6:
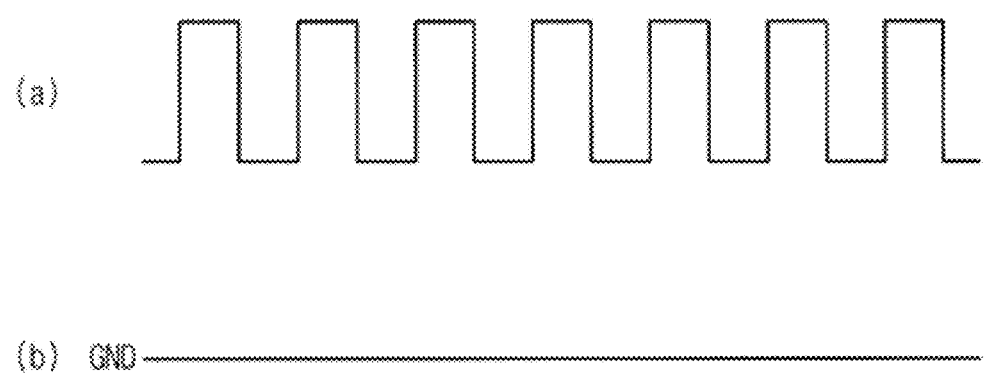
FIG. 6 shows another exemplary embodiment of waveforms of voltages applied to the first and second electrodes.

FIG. 5 shows one exemplary embodiment of waveforms of voltages applied to the first and second electrodes 130 and 140, and FIG. 6 shows another exemplary embodiment of waveform of voltages applied to the first and second electrodes 130 and 140.

Referring to FIG. 5, in one exemplary embodiment an AC voltage (a) and a non-AC voltage (b) are applied to the piezoelectric material layer 150 such that the volume of the piezoelectric material layer 150 is changed due to the alternation of the AC voltage (a), thereby causing vibration. In the present exemplary embodiment, the waveform of the AC voltage (a) may be substantially equal to a waveform of a common electrode signal of the LCD panel, and the waveform of the voltage (b) may be a waveform of a gate electrode signal of the LCD panel.

Referring to FIG. 6, in another exemplary embodiment an AC voltage (a) and a ground voltage (b) are applied to the piezoelectric material layer 150 such that the volume of the piezoelectric material layer 150 is changed due to the alternation of the AC voltage (a), thereby causing vibration. In the present exemplary embodiment, the waveform of the AC voltage (a) may be a waveform of a common electrode signal of the LCD panel, and the waveform of the voltage (b) may be a waveform of a ground voltage or the voltage driver may apply a predetermined non-zero voltage value thereto.

Figure 7:
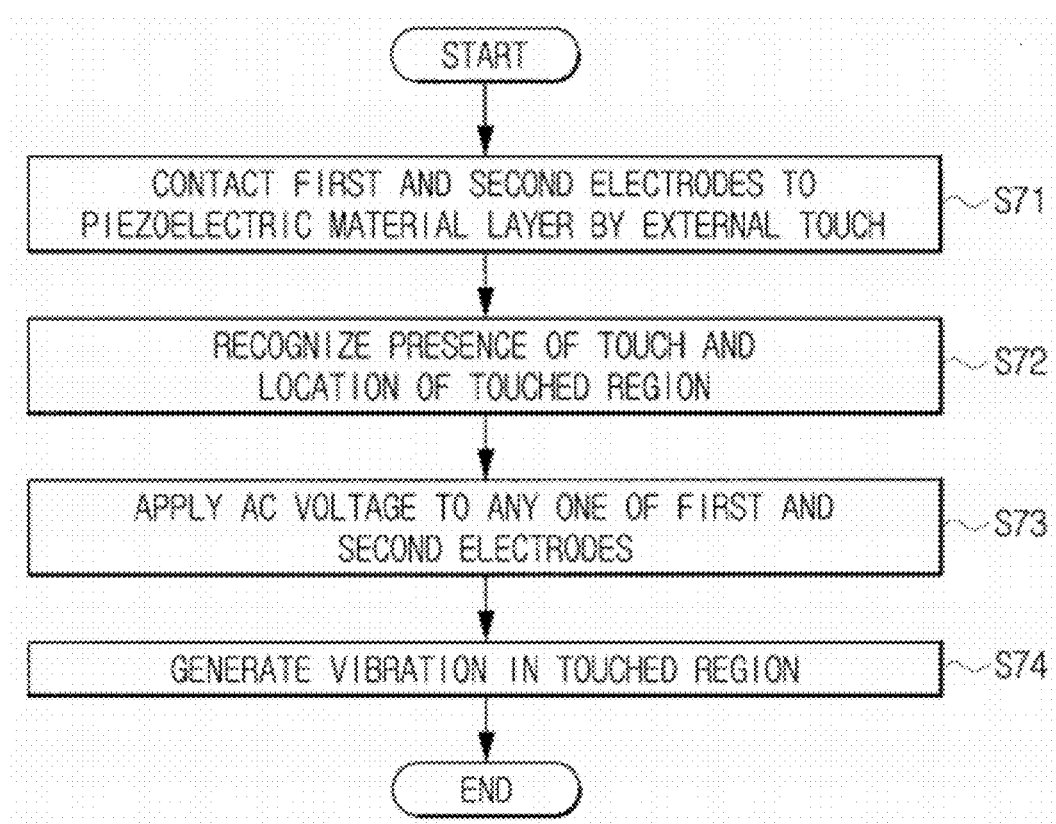
FIG. 7 is a flowchart illustrating an exemplary embodiment of a method for vibration touch sensing.

FIG. 7 is a flowchart illustrating one exemplary embodiment of a method for vibration touch sensing.

Referring to FIG. 7, the present exemplary embodiment of a method for vibration touch sensing includes; when an external touch is made, receiving an electrical signal generated from a piezoelectric material layer 150 formed on any one of first and second electrodes 130 and 140 to generate a touch input signal, when receiving the touch input signal, applying a first AC voltage to any one of the first and second electrodes 130 and 140; and when an external touch is made, contacting the first and second electrodes 130 and 140 to both ends of the piezoelectric material layer 150 to generate a vibration in a touched region by means of the AC voltage.

In the present exemplary embodiment of a method for vibration touch sensing, when an external touch is made, the external touch is sensed, and then an AC voltage is applied to any one of the first and second electrodes 130 and 140. In such an exemplary embodiment, energy consumption may be decreased as compared to the exemplary embodiment where AC voltage is substantially continuously applied to one of the electrodes 130 and 140. In the exemplary embodiment wherein an AC voltage is applied to the first electrode 130 as mentioned above, when an external touch is made to the second electrode 140, a voltage having different magnitude from the first voltage may be applied thereto. In other exemplary embodiments, the second electrode 140 may be substantially continuously applied with the ground to maintain a ground voltage.

If an external touch is made, the first and second electrodes are contacted with the piezoelectric material layer (S71). In the present exemplary embodiment, the first or second electrode 130 or 140 which is formed on the piezoelectric material layer is in contact with the piezoelectric material layer 150, and, when an external touch is made, the other electrode, e.g., the first or second electrode 130 or 140 which is not formed on the piezoelectric material layer 150, is contacted to the piezoelectric material layer 150.

If an external touch is made, the piezoelectric material layer 150 is pressed due to the pressure, and thus the volume of the piezoelectric material layer 150 is changed to generate an electrical signal. The electrical signal allows a controller to recognize the presence of the touch (S72). Further, if an external touch is made, capacitance or/and resistance of the touched region is changed due to the external touch, and thus a change of current or voltage induced from the voltage driver generates. The controller 200 operates the change of current or voltage, and then recognizes a location of the touched region (S72).

If an external touch is sensed, an AC voltage is applied to any one of the first and second electrodes 130 and 140(S73). In the exemplary embodiment wherein the first AC voltage is applied to the first electrode 130, a second voltage having different magnitude from the first voltage is applied to the second electrode 140.

Since the first and second voltages are applied to both ends of the piezoelectric material layer 150, a predetermined AC voltage flows along the piezoelectric material layer 150, and thus the volume of the piezoelectric material layer 150 is changed. Accordingly, a user may feel vibration in the touched region due to the change in volume of the piezoelectric material layer 150 (S74).

Figure 8:
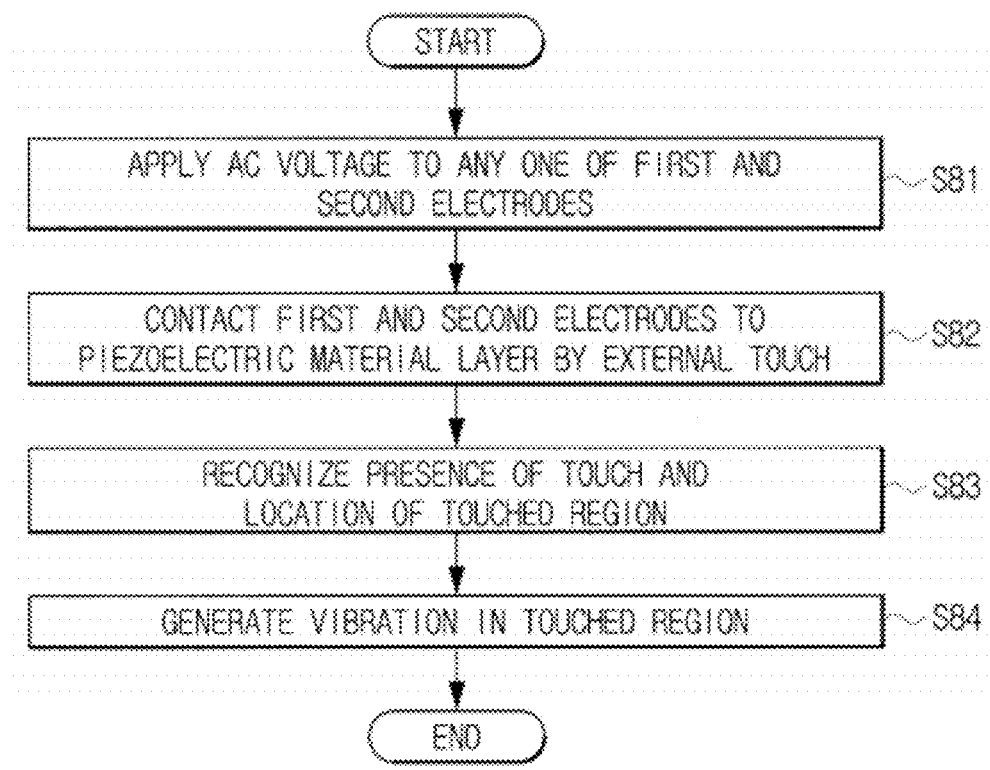
FIG. 8 is a flowchart illustrating another exemplary embodiment of a method for vibration touch sensing.

FIG. 8 is a flowchart illustrating another exemplary embodiment of a method for vibration touch sensing.

Referring to FIG. 8, the present exemplary embodiment of a method for vibration touch sensing includes; applying a first AC voltage to any one of first and second electrodes 130 and 140; when an external touch is made, receiving an electrical signal generated from a piezoelectric material layer formed on any one of the first and second electrodes 130 and 140 to generate a touch input signal, and when an external touch is made, contacting the first and second electrodes 130 and 140 to both ends of the piezoelectric material layer 150 to generate a vibration in a touch region by means of AC voltage.

The present exemplary embodiment of a method for vibration touch sensing is different from the exemplary embodiment of FIG. 7 in that the AC voltage is substantially continuously applied to the first or second electrode 130 or 140. The method disclosed in the present exemplary embodiment ensures simple control and allows more instant generation of vibration in a touched region. In the exemplary embodiment wherein an AC voltage is applied to the first electrode 130 as mentioned above, a voltage having different magnitude from the first voltage may be applied to the second electrode 140 when an external touch is made. In other cases, a constant voltage may be substantially continuously applied to the second electrode 140, or the second electrode 140 may be connected to the ground to substantially continuously maintain a ground voltage.

As shown in FIG. 8, an AC voltage is applied to any one of the first and second electrodes 130 and 140 (S81). In the exemplary embodiment wherein the first AC voltage is applied to the first electrode 130, a second voltage having different magnitude from the first voltage is applied to the second electrode 140.

If an external touch is made, the first and second electrodes 130 and 140 are contacted with the piezoelectric material layer 150 (S82). In such an exemplary embodiment, the electrode formed on the piezoelectric material 150 layer is in contact with the piezoelectric material layer 150, and, when an external touch is made, the other electrode is contacted to the piezoelectric material layer 150.

If an external touch is made, the piezoelectric material layer 150 is compressed due to the pressure, and thus the volume of the piezoelectric material layer 150 is changed to generate an electrical signal. The electrical signal allows a controller to recognize the presence of touch (S83). Further, if an external touch is made, capacitance or/and resistance of the touched region is changed due to the external touch, and thus a change of current or voltage induced from the voltage driver generates. The controller 200 operates the change of current or voltage, and then recognizes a location of the touched region (S83).

Since the first and second voltages are applied to both ends of the piezoelectric material layer 150, a predetermined AC voltage flows along the piezoelectric material layer 150, and thus the volume of the piezoelectric material layer 150 is changed. Accordingly, a user may feel vibration in the touched region due to the volumetric changes in the piezoelectric material layer 150 (S84).

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A vibration touch sensor, comprising:
   a first substrate;
   a second substrate arranged to face the first substrate with a predetermined gap therebetween;
   a first electrode disposed on the first substrate;
   a second electrode disposed on the second substrate;
   a piezoelectric material layer in contact with only one of the first electrode and the second electrode, wherein the piezoelectric material layer generates an electrical signal in response to an external touch applied to at least one of the first substrate and the second substrate and the piezoelectric material layer is in contact with both the first electrode and the second electrode; and
   a controller which receives the electrical signal generated from the piezoelectric material layer and generates a touch input signal, the controller controlling an alternating current voltage applied to at least one of the first electrode and the second electrode.

2. The vibration touch sensor according to claim 1, wherein, after receiving the generated electrical signal, the controller applies a first alternating current voltage to at least one of the first electrode and the second electrode.

3. The vibration touch sensor according to claim 1, wherein a first alternating current voltage is applied to one of the first electrode and the second electrode, and a second voltage having a different magnitude from the first alternating current voltage is applied to the other one of the first electrode and the second electrode.

4. The vibration touch sensor according to claim 3, wherein the second voltage is a ground voltage.

5. The vibration touch sensor according to claim 3,
   wherein the first alternating current voltage is substantially equal to a voltage of a common electrode of a liquid crystal display, and
   wherein the second voltage is substantially equal to a voltage of a gate electrode of the liquid crystal display.

6. The vibration touch sensor according to claim 3, wherein, when an external touch is applied to at least one of the first substrate and the second substrate, both the first electrode and the second electrode contact the piezoelectric material layer such that the first alternating current voltage and the second voltage are applied to both ends of the piezoelectric material layer.

7. A method for vibration touch sensing, comprising:
   receiving an electrical signal generated from a piezoelectric material layer formed to contact only one of a first electrode and a second electrode to generate a touch input signal when an external touch is applied and the piezoelectric material layer contacts both the first electrode and the second electrode;
   applying a first alternating current voltage to at least one of the first electrode and the second electrode when receiving the touch input signal;
   contacting the first electrode and the second electrode to both ends of the piezoelectric material layer using the external touch; and
   generating a vibration in a touched region using the first alternating current voltage.

8. The method for vibration touch sensing according to claim 7, wherein an operation of generating a touch input signal according to an electrical signal includes recognizing an existence of the external touch and a location of the touched region according to the electrical signal and generating the touch input signal.

9. The method for vibration touch sensing according to claim 7, further comprising:
applying a second voltage having different magnitude from the first alternating current voltage to the one of the first electrode and the second electrode which did not receive the first alternating current voltage.

10. The method for vibration touch sensing according to claim 9, wherein the second voltage is a ground voltage.

11. The method for vibration touch sensing according to claim 9,
wherein the first alternating current voltage is substantially equal to a voltage of a common electrode of a liquid crystal display, and
wherein the second voltage is substantially equal to a voltage of a gate electrode of the liquid crystal display.

12. A method for vibration touch sensing, comprising:
applying a first alternating current voltage to one of a first electrode and a second electrode;
receiving an electrical signal generated from a piezoelectric material layer formed on to contact only one of the first electrode and the second electrode to generate a touch input signal, when an external touch is applied;
contacting the first electrode and the second electrode with corresponding ends of the piezoelectric material layer by application of the external touch; and
generating a vibration in a touch region using the first alternating current voltage.

13. The method for vibration touch sensing according to claim 12, wherein an operation of generating a touch input signal according to an electrical signal includes recognizing an existence of the external touch and a location of the touched region according to the electrical signal and generating the touch input signal.

14. The method for vibration touch sensing according to claim 12, further comprising:
applying a second voltage having different magnitude from the first alternating current voltage to the one of the first electrode and the second electrode not applied with the first alternating current voltage.

15. The method for vibration touch sensing according to claim 14, wherein the second voltage is a ground voltage.

16. The method for vibration touch sensing according to claim 14,
wherein the first voltage is substantially equal to a voltage of a common electrode of a liquid crystal display, and
wherein the second voltage is substantially equal to a voltage of a gate electrode of the liquid crystal display.

17. A vibration touch screen display panel, comprising:
a display panel; and
a vibration touch sensor disposed on a front surface of the display panel, the vibration touch sensor including:
a first substrate;
a second substrate arranged to face the first substrate with a predetermined gap disposed therebetween;
a first electrode disposed on the first substrate;
a second electrode disposed on the second substrate;
a piezoelectric material layer in contact with only one of the first electrode and the second electrode, wherein the piezoelectric material layer generates an electrical signal in response to an external touch applied to at least one of the first substrate and the second substrate and the piezoelectric material layer is in contact with both the first electrode and the second electrode; and
a controller which receives an electrical signal generated from the piezoelectric material layer, the controller controlling an alternating current voltage applied to one of the first electrode and the second electrode.

18. The vibration touch screen display panel according to claim 17,
wherein the display panel is a liquid crystal display panel;
wherein the first electrode is electrically connected to a common electrode of the liquid crystal display panel; and
wherein the second electrode is electrically connected to a gate electrode of the liquid crystal display panel.

* * * * *